3,033,865
SOLUBILIZING COPPER-8-QUINOLINOLATE

George D. Fronmuller, Mamaroneck, and Michael J. Mirra, Woodside, N.Y., assignors, by mesne assignments, to Augustus S. Wittnebel, Bedford, N.Y.
No Drawing. Filed Apr. 9, 1959, Ser. No. 805,148
7 Claims. (Cl. 260—270)

The present invention is directed to compositions for rot-proofing or mildew-proofing various organic materials which are attacked by fungus, and more particularly to novel compounds of copper-8-quinolinolate, whereby the utility thereof is substantially enhanced.

It has been known for many years that copper-8-quinolinolate is effective for controlling rot and mildew in such organic materials as textiles, paper, leather, rope, film-forming coating compositions and the like. However, they had the disadvantage of being extremely insoluble in water and in most organic solvents. Attempts have been made to modify the copper quinolinolates in order to improve their solubility and various reaction products thereof have been made. Some of such reaction products had some solubility in a few organic substances, limiting the utility thereof. Such preparations could not be introduced into aqueous media, such as paper pulp.

For instance, it has been proposed to form a complex of a water-soluble copper salt with a higher fatty acid, 8-OH quinoline and an alkyl phenol, or to react a water-insoluble copper soap of a higher fatty acid with a water-insoluble rosin phenoxide to form a complex. But such products can be used only in solution in certain few organic solvents. It has also been proposed to form complexes by reacting rosin with a water-insoluble heavy metal soap with the copper salt of 8-OH quinoline; but the uses thereof were limited particularly where mildew or rot proofing takes place in aqueous media. While some of the prior compounds can be emulsified with water by means of certain emulsifying agents, the effectiveness thereof is unsatisfactory for many applications, the amounts thereof which can be deposited on the material to be protected are low and the retention is unsatisfactory. Because of the presence of the emulsifying agent and the fact that the coating is only on the surface, the compounds were easily washed off by contact with water.

The present invention is intended and adapted to overcome the disadvantages inherent in compositions of the type described, it being among the objects thereof to form reaction products of copper quinolinolates which have partial solubility or are dispersible in water and which may be used in aqueous media without the necessity for emulsification.

It is also among the objects of the invention to provide new compounds which are readily absorbed out of aqueous media by the organic materials to be protected, with a high degree of exhaustion of the copper compounds from the dispersion and onto the organic materials.

It is further among the objects of the present invention to provide such reaction products which are held tenaciously by the organic materials and are not substantially removed by the action of water or aqueous media, which are stable on the fiber and having an affinity for the fiber by electrostatic attraction.

In practicing the present invention the starting substance is usually copper-8-quinolinolate which consists of two molecules of 8-OH quinoline linked to a single copper atom by elimination of hydrogen and having the following structure:

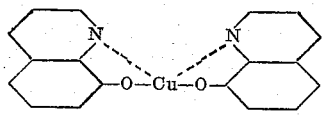

The invention contemplates a reaction involving the nitrogen whereby an organic radical may be attached thereto and the solubility of the derivative may be improved. The resulting products are most probably quaternary ammonium salts.

This approach has a dual advantage, namely, first, on forming the derivative the possibility of putting the reaction product in solution increases; and second, in forming the quaternary compound a positive electrostatic charge is produced, thus enhancing the possibility of absorbing the organic cation on electro-negative surfaces (e.g. paper, pulp).

There are a number of compounds which have the ability of forming quaternary salts with nitrogen compounds (e.g. alkyl bromides, benzyl chloride, di-alkyl sulfates). At present, from the systems evaluated, the di-alkyl sulfates are the most promising. The choice of solvent for this reaction mixture was found to be quite crucial. Three classes of solvents have been found to form a solution with the above mentioned reaction products. The class of solvents studied were completely water soluble and should not preferentially react with the dialkyl sulfate. Of the solvents studied, dimethyl sulfoxide, di-ethylene glycol monoethyl ether and triethyl phosphate were found to be effective to form solutions with the reaction products between diethyl sulfate and copper-8-quinolinolate.

These solvents appear to enter into or direct the reaction to some extent. Thus reacting the copper-8-quinolinolate with diethyl sulfate in constant ratio and temperature and changing the solvents produces solutions and reaction products that are different from the prior art not only in their chemical structure but also in other properties, such as their exhaustion onto pulp and textiles. Specific examples of this are given below, the solvents used in this reaction being important in determining the nature of the end product.

In carrying out of the reaction, there was provided a reaction vessel electrically heated and fitted with an agitator, thermometer and a rheostat controlled electric heating mantle. The copper-8-quinolinolate (which is a green solid) was suspended in the solvent and the diethyl sulfate then added. The system was heated to the desired temperature, which is generally 50° to 150° C., and agitated at this temperature for a given period of time. The variables of solvent, temperature, time and ratio of diethyl sulfate to copper-8-quinolinolate were studied, as shown in Table I attached hereto.

The above method of solubilizing the copper-8-quinolinolate was used in each preparation. The solution was studied not only for its use as a pulp additive (e.g. retention, etc.) but from the chemistry of the reaction product.

The reaction product was studied by separating the solid product from solution and running elemental analysis to obtain the chemical structure of the reaction products. The product was separated by pouring the solution into water under agitation where a fine precipitate formed; the acid precipitate was filtered, washed and dried to constant weight. The filtrate was made slightly alkaline (pH 7.5-8) causing another precipitate, which was filtered, washed and dried. Thus in each case the reaction products were separated into an acid precipitate and an alkaline precipitate. The indication is that the reaction is not simple, it may form a mixture of reaction products. The results of these reactions are summarized in Table I.

TABLE I

*Reaction Conditions and Analytical Data*

| Example | Molar Ratio of Cu-8-Q to Diethyl Sulfate | Solvent Used | Reaction Temp., °C. | Reaction Time, Hrs. | Solution Obtained | Acid Precipitate | | | Percent Cu in ppt. | Tot. Cu ppt. on Alk. side, Percent | Sulfur Qualit. |
|---|---|---|---|---|---|---|---|---|---|---|---|
| | | | | | | Percent Cu in ppt. | Tot. Cu ppt. on Acid Side, Percent | Sulfur Qualit. | | | |
| 1 | 1:3.16 | Dimethyl Sulfoxide. | 98-100 | 2 | Complete | 12.6 | 59.4 | pos | 25.9 | 42.8 | neg. |
| 2 | 1:3.16 | do | 78-80 | 2 | do | 14.82 | 58.8 | pos | 22.8 | 38.6 | neg. |
| 3 | 1:3.16 | do | 98-100 | 1 | do | 12.71 | 66.9 | pos | | 33 | neg. |
| 4 | 1:3.16 | do | 98-100 | 5 | do | 10.4 | 58.4 | pos | | 41.6 | neg. |
| 5 | 1:1.58 | do | 140 | 1.5 | do | 12.92 | 69.4 | pos | 17.75 | 30.6 | neg. |
| 6 | 1:1.58 | do | 98-100 | 2 | do | 14.59 | 70 | pos | 25.4 | 30 | neg. |
| 7 | 1:3.16 | do | 68-70 | 2 | do | 16.12 | 44.7 | pos | 18.10 | 47.5 | neg. |
| 8 | 1:3.16 | do | 53-57 | 2.5 | do | 15.47 | 31.8 | pos | 20.41 | 50.3 | neg. |
| 9 | 1:3.16 | do | 44-46 | 5 | Incomplete. | | | | | | |
| 10 | 1:1 | do | 98-100 | 6 | do | | | | | | |
| 11 | 1:3.16 | Carbitol | 100 | 1 | Complete | 15.30 | 37 | neg | 19.06 | 63 | neg. |
| 12 | 1:1.58 | do | 100 | 1 | do | 14.97 | 41.5 | neg | 19.90 | 57.5 | neg. |
| 13 | 1:3.16 | Triethyl Phosphate. | 100 | 2 | do | 10.77 | 8.79 | neg | 26.04 | 85.36 | neg. |

In each of the examples in Table I, the ratio of solvent to copper-8-quinolinolate by weight was 6.5 to 1. The final products were all completely soluble in the solvent except No. 9, which had been heated at a lower temperature, and No. 10 which had a lower ratio.

It will be noted from the data in Table I that the compounds precipitated from water on the acid side, contain sulfur as part of the molecule only when dimethyl sulfoxide is used as the solvent. In the case of reaction (1) Table I, for example, there was 6.54% sulfur found in the acid precipitated fraction. From the copper content (12.6%) and the sulfur content (6.54%) of the reaction product from reaction (1) Table I, various possible structural formulas can be postulated, in all of which there are two ethyl radicals and one sulfur containing radical.

On the other hand, the alkaline precipitates from reactions using dimethyl sulfoxide as solvent appear to be cleavage products as they have lower molecular weights. The precipitates formed in the reactions using diethylene glycol monoethyl ether and triethyl phosphate appear to be mixtures of several reaction products.

TREATMENT OF PAPER PULP WITH REACTION SOLUTIONS

The copper complex solutions as obtained from the reactions as described above contained approximately 2.0% copper. These solutions were added directly to paper pulp so that there would be about 0.18% copper on the weight of the dry pulp. After the paper was made, copper determinations were run to determine the percent retention of the copper on the pulp.

Example:
2000 g. pulp at 3% consistency (60.0 g. dry pulp).
5.4 g. copper complex solution at 2% Cu.

After the copper solution has been added and the pH adjusted to about 7.5 to 8.0 with caustic soda, the pulp was diluted to about 0.5%, the pH adjusted to about 4.5 to 5.0 with alum, and hand sheets were made. The hand sheets contained:

TABLE II

| Reaction Solution (Table I) | Percent Cu in sheet | Percent Retention |
|---|---|---|
| 1 | .178 | 98-99 |
| 11 | .07-.08 | 40 |
| 13 | .02-.03 | 11-12 |

Thus, it is obvious that the reactions using dimethyl sulfoxide gave the best retention.

Studies were carried out on this system to see if the copper complexes would migrate from the paper under various conditions. This was done in both static and constant flow systems. In the flow studies the treated paper with reaction solution (1) Table I was placed in a glass flask and water was passed through at the rate of 500 ml./min. Samples of the paper were tested periodically with the following results.

TABLE III

*Constant Flow Systems, Rate—500 ml./min.*

| | Days Tested | Percent Cu found | Percent Cu lost |
|---|---|---|---|
| Paper treated with solution No. 1 Table I | 0 | 0.187 | |
| | 3 | 0.164 | 12.3 |
| | 7 | 0.163 | 12.8 |
| | 13 | 0.151 | 19.0 |
| Paper treated with solution 11 Table I | 0 | .078 | |
| | 3 | .053 | 32 |
| | 9 | .049 | 37 |

In the static test the treated paper samples were placed in a closed bottle with water at different pH values and temperatures. They were also placed in various oils and milk. The paper was removed from time to time to note if any copper had migrated into the liquid phase. A summary of these results is listed in Table IV.

TABLE IV

*Paper Treated With Solution 1 Table I With 0.187% Copper*

| | pH | 1 Week, percent Cu | 3 Weeks, percent Cu | 9 Weeks, percent Cu |
|---|---|---|---|---|
| Water at room temp | 2.85 | .147 | .134 | .137 |
| | 4.5 | .178 | .197 | .162 |
| | 7.35 | .183 | .186 | .157 |
| | 9.35 | .165 | .172 | .159 |
| Water at 120° F | 2.85 | .138 | .157 | .136 |
| | 4.5 | .177 | .180 | .155 |
| | 7.35 | .179 | .187 | .159 |
| | 9.35 | .186 | .180 | |
| Oils at R.T.: | | | | |
| Corn Oil | | | .180 | .170 |
| Mineral Oil | | | .192 | .193 |
| Orange Oil | | | .180 | .200 |

| | | 6 days | 13 days | 3 Weeks |
|---|---|---|---|---|
| Milk at 3° C.: | | | | |
| fresh milk | | .130 | .134 | .135 |
| non fat dry milk | | .136 | .129 | .175 |

From the data presented in Table III and Table IV it appears that the copper complex prepared using dimethyl sulfoxide as the solvent is more firmly bound in the paper than the complex formed using the other solvents.

In most cases the migration of the copper complex was not serious and it leveled out on the average at about 15–16% of copper loss.

Thus the indications are that the copper-8-quinolinolate solutions as prepared as set forth above using dimethyl sulfoxide could be used as a pulp additive. The copper complexes do not leach out of the pulp in serious amounts under a variety of conditions. It is uniformly dispersed through the fiber mass and does not alter the physical properties of the paper.

PROPERTIES OF PAPER TREATED WITH REACTION SOLUTION (1) TABLE I (I) *Mildew resistance.*—To test the mildew resistance of paper treated with the above mentioned copper solutions, a standard mildew resistance test, ASTM Designation D 684–54 modified, was carried out. The paper contained 0.187% copper from the reaction solution (1) Table I, and was a light weight sheet, e.g. 20 lbs. per 3000 sq. ft.

Inoculation test—Mineral salt agar:
Leaching—None.
Sterilization—None.
Incubation—21 days at 28–30° C.
Organisms—A single spore suspension of *Aspergillus niger*—USDA–TC215–4247, *Chaetomium globosum* USDA 1042.4.

Test results after 21 days:
Sample—Evaluation of growth, visually.
Untreated control—Copious, completely disintegrated.
Treated paper (.187% Cu)—None.

(II) *Tensile studies of paper after mineral salts test.*—The tensile strengths of the paper was carried out before and after exposure to the spore suspensions for 21 days.

TABLE V

*Tensile Breaking Strength (Method No. 171, UU–P–316)*

| | Pound per inch width | |
| --- | --- | --- |
| | Machine direction | Cross direction |
| Untreated Control: | | |
| Original | 21.3 | 7.1 |
| After *Asperg. niger* | Copious growth on samples Completely disintegrated | |
| After *Chaet. glob* | | |
| Treated Paper: | | |
| Original | 25.4 | 11.3 |
| After *Asperg. niger* | 28.7 | 10.6 |
| After *Chaet. glob* | 26.9 | 10.1 |

According to the above tests the paper treated with the copper complexes as prepared herein are rendered fungus resistant (Tappi Standard Test T487–M54). The strength of the treated paper was not adversely affected by the organisms after 21 days of exposure (Table V).

The invention has demonstrated that a new method to solubilize copper-8-quinolinolate has been accomplished, and that this solution is water dispersible without the use of any auxiliary agents. It has also been demonstrated that the copper complex formed according to the method described above has the property of exhausting from the water phase onto electro-negative surfaces (pulp) more or less irreversibly (see migration tests), and that paper pulp treated with these copper solutions are rendered mildew resistant without adversely affecting the properties of the paper.

The following is an example of the preparation of the new compounds claimed herein.

The constituents are—

| | Parts by weight |
| --- | --- |
| Copper-8-quinolinolate | 351.50 |
| Diethyl sulfate | 486.60 |
| Dimethyl sulfoxide | 2234.75 |

The dimethyl sulfoxide is placed in a suitable vessel equipped with a source of heat and an agitator. The copper-8-quinolinolate is suspended in the solvent and then diethyl sulfate is added. The mixture is agitated gently and heated to 98°–100° C., and is held at this temperature for about two hours while continuing the agitation. After this period the copper-8-quinolinolate is completely in solution. The reaction mixture is cooled and filtered into a storage container. The resulting solution is a dark green liquid containing about 2.03% of copper.

Although the invention has been described by the use of diethyl sulfate as a reactant other alkyl sulfates may be used in which the alkyl group has 1 to 8 carbon atoms. Other solvents of the classes described may be used; for instance, in place of dimethyl sulfoxide, the ethyl or propyl or mixed alkyl sulfoxides are applicable. Instead of the diethylene glycol monoethyl ether, the corresponding propylene compound may be used and the ethyl group may be replaced by the methyl or propyl group. The triethyl phosphate may have one or more methyl or propyl radicals in place of the ethyl.

In the description data was given relative to the effectiveness of the new compounds in the treatment of paper pulp. This example was for purpose of illustration only and it does not limit the applications of these compounds as other organic materials subject to rot or mildew may be treated with equally good results.

There may be present in the reaction mixture an excess of the dialkyl sulfate over the theoretical, such excess not affecting the reaction. The order of introduction of the constituents may be varied as, for example, the copper quinolinolate may be introduced last.

What is claimed is:

1. A method of solubilizing copper 8-quinolinolate which comprises suspending the same in a water soluble solvent taken from the class consisting of di-lower alkyl sulfoxide, di-lower alkylene glycol mono-lower alkyl ether and tri-lower alkyl phosphate, the solvent having a boiling point above the temperature of the reaction, adding thereto dialkyl sulfate the alkyl group of which has 1–8 carbon atoms, and heating the mixture to a temperature of about 50°–150° C. to form a derivative of copper 8-quinolinolate having improved water solubility.

2. A method according to claim 1 in which the molar ratios of said quinolinolate to sulfate are about 1 to 1.5 to 3.

3. A method according to claim 1 in which the weight ratios of said solvent to quinolinolate are about 6.5 to 1.

4. A method according to claim 1 in which the solvent is dimethyl sulfoxide.

5. A method according to claim 1 in which the solvent is diethylene glycol monoethyl ether.

6. A method according to claim 1 in which the solvent is triethyl phosphate.

7. A new composition of matter consisting of the derivative of copper 8-quinolinolate produced by the method of claim 1.

References Cited in the file of this patent

UNITED STATES PATENTS

| 2,381,863 | Benignus | Aug. 14, 1945 |
| 2,756,175 | Goldstein et al. | July 24, 1956 |
| 2,770,626 | Nicholson et al. | Nov. 13, 1956 |

OTHER REFERENCES

Noller: Chemistry of Organic Compounds, 2nd ed., pages 108–110 (1957).